United States Patent
Pettit

(10) Patent No.: US 6,947,504 B1
(45) Date of Patent: Sep. 20, 2005

(54) FREQUENCY SYNCHRONIZER

(75) Inventor: Ray H. Pettit, San Diego, CA (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 670 days.

(21) Appl. No.: 09/785,624

(22) Filed: Feb. 16, 2001

(51) Int. Cl.[7] ............................................. H04L 27/06
(52) U.S. Cl. ...................... 375/344; 375/326; 375/343
(58) Field of Search ................................. 375/354, 344, 375/326, 327, 324, 340, 343, 316

(56) References Cited

U.S. PATENT DOCUMENTS

| | | | |
|---|---|---|---|
| 6,466,630 B1 * | 10/2002 | Jensen | 375/327 |
| 6,590,941 B2 * | 7/2003 | Legrand et al. | 375/316 |
| 6,608,873 B1 * | 8/2003 | Spinnler et al. | 375/343 |
| 6,662,000 B1 * | 12/2003 | Belveze et al. | 455/208 |
| 6,721,366 B1 * | 4/2004 | Van Stralen | 375/262 |

* cited by examiner

Primary Examiner—Phuong Phu

(74) Attorney, Agent, or Firm—Peter A. Lipovsky; Michael A. Kagan; Andrew J. Cameron

(57) ABSTRACT

A frequency synchronizer system is based on the maximum likelihood criterion from estimation theory and that can achieve both frequency acquisition and frequency tracking without requiring knowledge at the receiver of the carrier's phase angle, baud timing, or a preamble consisting of known signal symbols. The synchronizer includes a processor for executing the following sequence of operations: a) initializing an estimated frequency correction factor; b) determining a corrected frequency offset value from a first product of a sample signal and the estimated frequency correction factor; c) filtering a first sample of the corrected frequency offset value to obtain a filtered corrected frequency offset value; d) imparting a delay to a second sample of the corrected frequency offset value to obtain a delayed corrected frequency offset value; e) determining a conjugate product value from a second product of the filtered corrected frequency offset value and a conjugate of the filtered corrected frequency offset value; f) determining a delay conjugate value from a third product of the delayed corrected frequency offset value and the conjugate product value; g) determining an error signal from the delay conjugate value; h) determining a frequency offset value from the error signal; and i) determining an updated value of the estimated frequency correction factor from the frequency offset value.

13 Claims, 3 Drawing Sheets

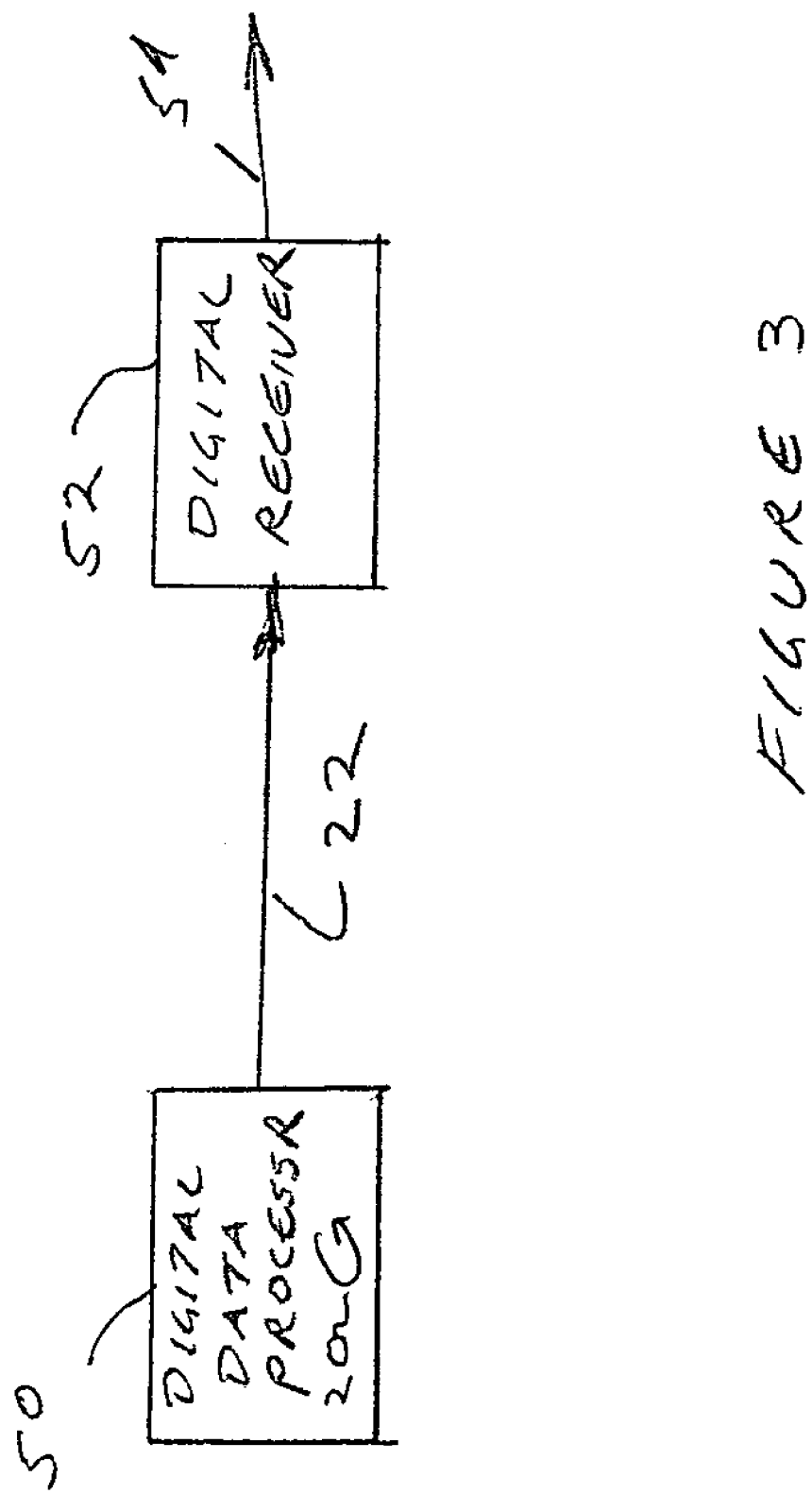

FREQUENCY SYNCHRONIZER

BACKGROUND OF THE INVENTION

The present invention generally relates to frequency synchronizers for digital communications systems, and more particularly, to frequency synchronizers that are based on the maximum likelihood criterion from estimation theory and that can achieve both frequency acquisition and frequency tracking without requiring knowledge at the receiver of the carrier's phase angle, baud timing, or a preamble consisting of known signal symbols.

All digital communications systems operate on the basis of a finite number of possible waveforms available for transmission during any particular signaling interval. The digital receivers must process versions of these transmitted waveforms which are corrupted by noise, channel fading, multipath, distortion, unintentional interference, and jamming, for example. The receiver's task is to determine which was the transmitted waveform for a particular signaling interval. Acceptable performance requires that this determination be achieved with high probability of correctness.

The degree of success potentially achievable by a digital communications system depends on the accuracy of reference signals at the receiver in their representation of the possible transmitted waveforms, as they would appear at the receiver, including the effects of noise, etc. To a large degree, achieving good reference signals is synonymous with having the receiver be synchronized with the transmitted waveforms arriving over a transmission channel.

Synchronization in a particular case may involve several parameters. For example, the receiver's reference signals should be based on the correct carrier frequency, which may be unknown due to oscillator drifts or doppler shifts. For best performance, the receiver should have a timing reference to know the beginning of each signaling waveform. For Time-Division-Multiplex (TDM) and/or Time-Division-Multiple Access (TDMA) systems, the level of timing information must be extended to knowing the beginning of groups of time slots (frame synchronization). In order to have the performance improvement potentially available from coherent detection; the receiver requires accurate knowledge of the carrier's phase angle (phase synchronization). For spread-spectrum systems, synchronization to a hopping-frequency pattern and/or a spread-spectrum code sequence is required. For all levels of synchronization, typically the receiver's synchronizers are required to provide good estimates of the unknowns (frequency, phase, timing, etc.) during an initial start-up period (so-called "acquisition") and to continue to provide good estimates as the system proceeds to operate (so-called "tracking").

Two general approaches have been useful for designing synchronizers for digital receivers. Many existing synchronizers are based on good engineering reasoning as to what can work (so-called "ad hoc" procedures), as opposed to being mathematically derived based on various math models and theoretical reasoning. Synchronizers of the latter type typically are derived, and implemented, by using the tools of Estimation Theory based upon the Maximum-Likelihood criterion of goodness (maximization of appropriate conditional probability density functions).

The choice and/or design of synchronizers for a particular system greatly depends on the digital modulation technique to be employed and the channel over which the communication is to take place. Practical solutions have long existed for conventional digital modulation techniques such as Phase Shift Key (PSK), Frequency Shift Key (FSK), Amplitude Shift Key (ASK), and Quadrature Amplitude Modulation (QAM), particularly for the case of a Gaussian noise channel. To meet requirements of transmitting data at high rates, with high accuracy, and with minimal bandwidth usage, newer digital signaling techniques have been found. These include Trellis-Coded Modulation (TCM) and Continuous-Phase Modulation (CPM). Generally, the synchronizers for the older, conventional digital receivers are inadequate for the newer techniques. In fact, there are many theoretical versions (special cases) of the energy-efficient and bandwidth-efficient CPM which would be preferred choices for applications but for the lack of good, achievable synchronizers. Since general solutions are unknown, each category of CPM requires finding specialized solutions for the synchronizer designs required for system operation.

An existing system for which better synchronizers are desirable is a special version of CPM known as dual-h, 4-ary, full-response. The meaning of these terms follows from the mathematical model of a signal having the specified CPM waveform, s(t), given below.

$$s(t) = \sqrt{\frac{2E_s}{T}} \, e^{j\Psi(t,\underline{\alpha})}$$

with $E_s$ representing the waveform's energy over its interval T, and $\Psi(t,\underline{\alpha})$ is the phase function. The function $\Psi(t,\underline{\alpha})$ depends on the data sequence $\underline{\alpha}=(---\alpha_{i-1},\alpha_i,\alpha_{i+1},---)$ where each of the data symbols is randomly and independently selected from the four possibilities ($\pm 1$, $\pm 3$), hence "4-ary." Also, $\Psi(t,\underline{\alpha})$ depends on two constants $h_0$ and $h_1$, called "modulation indexes," and a function q(t), called the "phase response function," as follows.

$$\Psi(t, \underline{\alpha}) = 2\pi h_0 \sum_i \alpha_{2i} q(t - 2iT) + 2\pi h_1 \sum_i \alpha_{2i+1} q(t - 2i - T)$$

For "full response" CPM, the function q(t), is as shown in FIG. 1.

A method for synchronizing for the above CPM waveform case requires transmitting a preamble at the beginning of a message. The preamble is a sequence of non-data symbols, known to the receiver. This preamble sequence is transmitted by means of a modulation technique, less complex than the CPM used for data, called Minimum Shift Key (MSK). However, this method of synchronization has certain undesirable characteristics. For example, the requirement that a start-up interval be set aside for a known preamble means a reduction in information rate. A serious problem arises if the receiver is unable to detect the preamble, thus leading to the loss of the follow-on message. Another potential problem of great concern when operating in the presence of an adversary is that the use of a different modulation for a preamble from that for data offers the adversary significant information useful for a jamming attack.

Therefore, a need exists for synchronization processors/circuits that operate without a preamble and without changing modulation methods within a transmission.

SUMMARY OF THE INVENTION

The present invention provides a frequency synchronizer that does not require a transmitted known-sequence preamble prior to the transmission of information symbols as a message. Nor does the synchronizer require that the receiver be synchronized in time or carrier phase prior to its operation to obtain information allowing the receiver to become synchronized in frequency, so-called frequency acquisition. In addition to frequency acquisition, the frequency synchronizer provides the receiver with continual updates on reference-frequency changes during the time of message transmission, so-called frequency tracking.

The frequency synchronizer is based on the maximum likelihood criterion from estimation theory and that can achieve both frequency acquisition and frequency tracking without requiring knowledge at the receiver of the carrier's phase angle, baud timing, or a preamble consisting of known signal symbols. The synchronizer is part of a system that includes a processor for executing the following sequence of operations: a) initializing an estimated frequency correction factor, as for example, at zero; b) determining a corrected frequency offset value from a first product of a sample signal and the estimated frequency correction factor; c) filtering a first sample of the corrected frequency offset value to obtain a filtered corrected frequency offset value; d) imparting a delay to a second sample of the corrected frequency offset value to obtain a delayed corrected frequency offset value; e) determining a conjugate product value from a second product of the filtered corrected frequency offset value and a conjugate of the filtered corrected frequency offset value; f) determining a delay conjugate value from a third product of the delayed corrected frequency offset value and the conjugate product value; g) determining an error signal from the delay conjugate value; h) determining a frequency offset value from the error signal; and i) determining an updated value of the estimated frequency correction factor from the frequency offset value.

The frequency synchronizer is applicable for use in conjunction with receivers that detect communications signals that belong to a class of digital modulation waveforms known as dual-h, 4-ary, full-response, CPM.

Since the frequency synchronizer of the invention operates without a transmitted preamble, the energy efficiency and the bandwidth efficiency of the communications system are greater than for systems that require preambles. An important advantage of the invention is that it obviates the need for different modulation methods for signals that employ preambles.

Other advantages of the invention will become apparent upon review of the following specification, including the claims, and the accompanying figures.

BRIEF DESCRIPTION OF THE DRAWINGS

FIG. 3 shows a digital data processor for implementing the method depicted in FIG. 2 and for providing a corrected frequency offset value to a digital receiver.

Throughout the several views, like elements are referenced using like references.

DESCRIPTION OF THE PREFERRED EMBODIMENT

Figure 1:
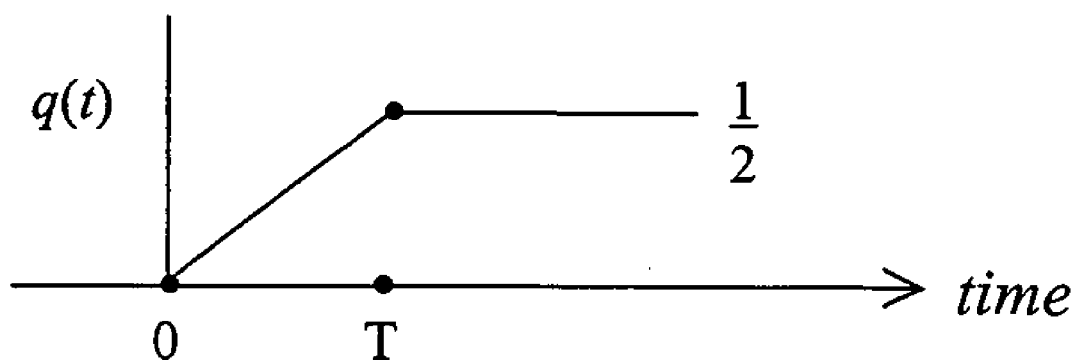
FIG. 1 illustrates the function q(t) for a "full response" Continuous-Phase Modulation (CPM) signal.
Figure 2:
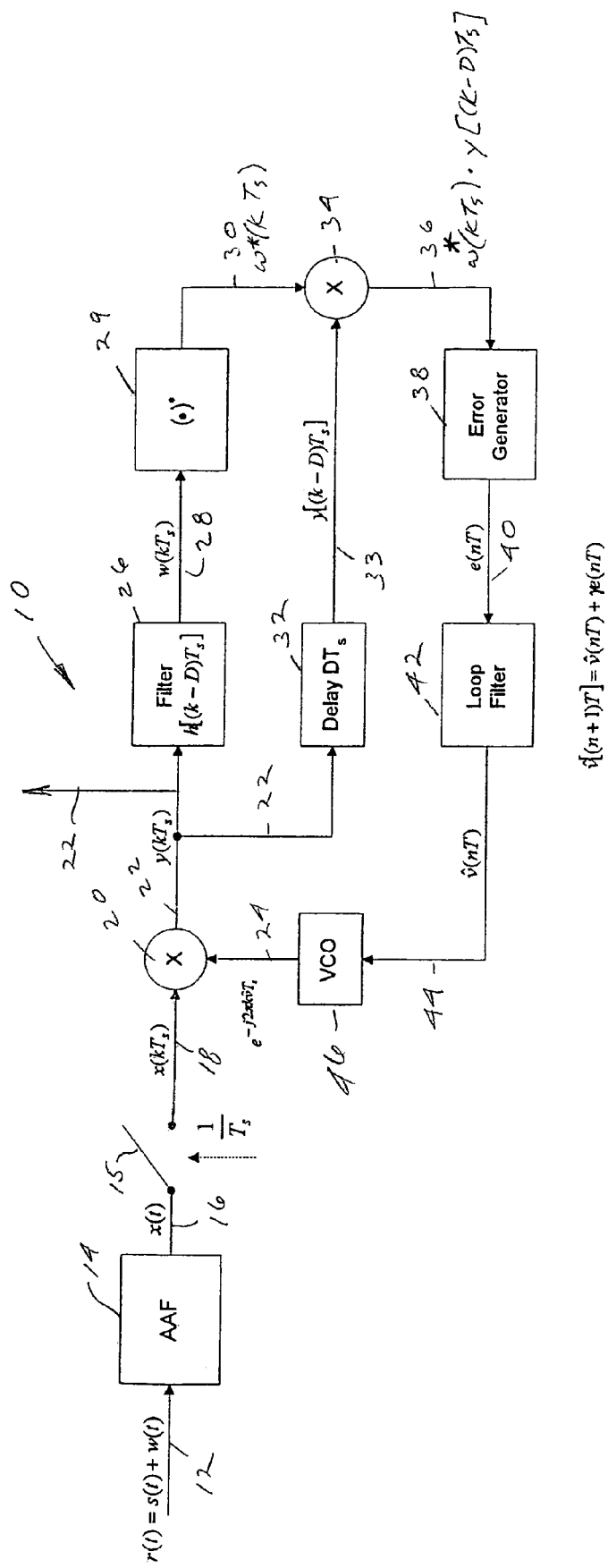
FIG. 2 is a block diagram representing a method for implementing a frequency synthesizer that embodies the various features of the present invention.

The present invention is directed to a frequency synchronizer for synchronizing to a Continuous-Phase Modulation (CPM) signal that does not require phase or timing information from a detected signal prior to processing for frequency estimation. Nor does the invention require that there be a preamble of known symbols at the beginning of a transmitted sequence. Referring to FIG. 2, there is shown a block diagram of a method for implementing a frequency synthesizer 10 that embodies several features of the present invention. A received signal 12 consisting of a CPM signal s(t) of the dual-h, 4-ary, full-response type and an additive white Gaussian noise component w(t) may be represented as a function of time t by the equation r(t)=s(t)+w(t). Signal 12 is transformed by an anti-aliasing filter 14 into a time dependent signal 16 represented by x(t). The anti-aliasing filter 14 essentially removes from signal 12 those frequency components not essential for maintaining information contained in CPM signal, s(t), thereby reducing the inherent distortion produced by sampling time-limited analog waveforms. Signal 16 is sampled by sampler 15 at intervals spaced $T_s$ seconds apart; i.e., at, a sampling rate of $1/T_s$ samples per second. The sample 15 is represented as a switch that opens and closes at a frequency $1/T_s$. The signal 18 emitted by sampler 15 is a set of discrete time samples represented by $x(kT_s)$, where k is an integer index so that $x(kT_s)$ is the $k^{th}$ sample of the set $x(kT_s)$.

Signal 22 is a corrected frequency offset value that is represented by $y(kT_s)$, also a set of discrete time samples, produced by multiplying signal 18 $[x(kT_s)]$ by signal 24 at multiplication node 20, where signal 24 represents an estimated frequency correction factor. At the initialization of the operation of frequency synchronizer 10, signal 24 may be provided with an initial value of zero. Signal 24 is a discrete time sequence represented by $e^{-j2\pi k\hat{v}T_s}$. The resultant product from node 20 is signal 22, and represents a corrected version of signal 18 $[x(kT_s)]$, with the correction taking the form of subtracting from signal 18 an estimate $\hat{v}$ produced by synchronizer 10 of the unknown frequency offset v from the actual carrier frequency of CPM signal s(t). Next, signal 22, i.e., the sequence $y(kT_s)$, is filtered by a digital filter 26 having impulse response $h(kT_s)$. The impulse response $h(kT_s)$ is specified by the following equations:

$$h(kT_s)=kF_2(kT_s), \text{ for } -N \leq k \leq -1$$

$$=kF_3(kT_s), \text{ for } 1 \leq k \leq N$$

$$=0, \text{ for } f=0 \text{ or } |k|>N,$$

where N represents the number of samples for each information symbol interval, and where $F_2$ and $F_3$ are functions defined as follows:

$$F_2(k_1T_s, k_2T_s) = \frac{1}{4}\left[1 + \frac{(k_2-k_1)}{N}\right]\left[\cos\frac{3\pi h_0(k_2-k_1)}{N} + \right.$$

$$\cos\frac{\pi h_0(k_2-k_1)}{N} + \cos\frac{3\pi h_1(k_2-k_1)}{N} +$$

$$\left.\cos\frac{\pi h_1(k_2-k_1)}{N}\right] + \frac{1}{4\pi}\left\{\left[\frac{h_1}{3(h_0^2-h_1^2)} + \right.\right.$$

$$\frac{3h_1}{h_0^2-9h_1^2}\right]\sin\frac{3\pi h_1(k_2-k_1)}{N} +$$

$$\left[\frac{h_1}{9h_0^2-h_1^2} + \frac{h_1}{h_0^2-h_1^2}\right]\sin\frac{\pi h_1(k_2-k_1)}{N} +$$

$$\left[\frac{h_0}{9h_1^2-h_0^2} + \frac{h_0}{h_1^2-h_0^2}\right]\sin\frac{\pi h_0(k_2-k_1)}{N} +$$

-continued $$\left[\frac{h_0}{3(h_1^2 - h_0^2)} + \frac{3h_0}{h_1^2 - 9h_0^2}\right]\sin\frac{3\pi h_0(k_2 - k_1)}{N}\right\}$$

$$= F_2[(k_2 - k_1)T_s]$$

and where:

$$F_3(k_1T_s, k_2T_s) = \frac{1}{4}\left[1 - \frac{(k_2 - k_1)}{N}\right]\left[\cos\frac{3\pi h_0(k_2 - k_1)}{N} + \cos\frac{\pi h_0(k_2 - k_1)}{N} + \cos\frac{3\pi h_1(k_2 - k_1)}{N} + \cos\frac{\pi h_1(k_2 - k_1)}{N}\right] + \frac{1}{4\pi}\left\{\left[\frac{h_1}{3(h_1^2 - h_0^2)} + \frac{3h_1}{9h_1^2 - h_0^2}\right]\sin\frac{3\pi h_1(k_2 - k_1)}{N} + \left[\frac{h_1}{h_1^2 - 9h_0^2} + \frac{h_1}{h_1^2 - h_0^2}\right]\sin\frac{\pi h_1(k_2 - k_1)}{N} + \left[\frac{h_0}{h_0^2 - 9h_1^2} + \frac{h_0}{h_0^2 - h_1^2}\right]\sin\frac{\pi h_0(k_2 - k_1)}{N} + \left[\frac{h_0}{3(h_0^2 - h_1^2)} + \frac{3h_0}{9h_0^2 - h_1^2}\right]\sin\frac{3\pi h_0(k_2 - k_1)}{N}\right\}$$

$$= F_3[(k_2 - k_1)T_s]$$

Since filter 26 is non-casual, a time delay of D sampling intervals is incorporated into $h(kT_s)$ of filter 26. By way of example, D may be set equal to 2N, but other choices are possible as might be suitable for particular applications. The filter 26 is thus shown as $h[(k-D)T_s]$ so as to incorporate the necessary delay. The output of filter 26 is a signal 28 represented as a discrete time sequence $w(kT_s)$, which is transformed at step 29 into signal 30, the conjugate sequence $w^*(kT_s)$. Signal 28 represents a filtered corrected frequency offset value. Signal 22 [$y(kT_s)$] is also delayed D sampling intervals by the delay 32, which produces signal 33, represented as $y[(k-D)T_s]$ and described as a delayed corrected frequency offset value. The multiplier 34 forms a signal 36 which is a discrete time sequence and is the product of signals 30 and 33, i.e., $w^*(kT_s) y[(k-D)T_s]$. Signal 30 is described as a conjugate produce value. Signal 36, a delay conjugate value, is provided as an input to error generator 38.

Error generator 38 transforms signal 36 into error signal 40 which is a discrete time sequence $e(nT)$, with n being the positive integer index allowing for the generation of updated error signals at intervals of T seconds. T is the time for each separate CPM waveform and is $NT_s$. The error signal 40 [$e(nT)$] for a particular value of n is calculated by error generator 38 from the summing of N real numbers comprising signal 36, as follows:

$$e(nT) = \sum_{k=nN}^{(n+1)N-1} I_m\{y[(k-D)T_s]w*(kT_s)\}.$$

The error signal 40 is used by loop filter 42 to produce signal 44, a frequency offset value, which is a sequence $\hat{v}(nT)$ of estimates of the unknown frequency offset V. The sequence $\hat{v}(nT)$ is produced iteratively by the discrete time loop filter 42 which is a first-order filter described by the difference equation $$\hat{v}[(n+1)T] = \hat{v}(nT) + \gamma e(nT).$$

Thus, the next estimate $\hat{v}[(n+1)T]$ of the unknown frequency offset is the present estimate of $\hat{v}(nT)$ added to the error signal 40 [$e(nT)$] that is weighted by a step-size parameter constant γ selected from computer simulations for a particular application. The choice of γ is based upon a need to have the sequence $\hat{v}(nT)$ converge toward v at a reasonable rate without having large overswings.

Signal 44, represented as the sequence $\hat{v}(nT)$, is converted by a discrete time voltage controlled oscillator (VCO) 46 into signal 24, which was previously described above as the sequence $e^{-j2\pi k\hat{v}T_s}$ for updating and correcting signal 18 [$x(kT_x)$]. The frequency synchronizer 10 is, therefore, a discrete time closed-loop processor, suitable for both frequency acquisition and frequency tracking.

Referring to FIG. 3, frequency synchronizer 10 may be implemented as a sequence of executable operations in a discrete time digital data processor 50 which provides signal 22 (a corrected frequency offset) to a digital receiver 52, which outputs a signal 54. Signal 54 is a data sequence that represents an improved estimate of the data encoded in signal 12, or s(t). The operation of frequency synchronizer 10 may be repeated any integral number of times to provide increasingly refined values for the corrected frequency offset value as represented by signal 22.

Obviously, many modifications and variations of the present invention are possible in light of the above teachings. It is therefore to be understood that within the scope of the appended claims, the invention may be practiced otherwise than as specifically described.

I claim:
1. A frequency synchronizer system, comprising:
    means for determining a corrected frequency offset value from a first product of a sample signal and an estimated frequency correction factor;
    means for filtering a first sample of said corrected frequency offset value to obtain a filtered corrected frequency offset value;
    means for imparting a delay to a second sample of said corrected frequency offset value to obtain a delayed corrected frequency offset value;
    means for transforming into a conjugate product value said filtered corrected frequency offset value;
    means for determining a delay conjugate value from a third product of said delayed corrected frequency offset value and said conjugate product value;
    means for determining an error signal from said delay conjugate value;
    means for determining a frequency offset value from said error signal; and
    means for determining an updated value of said estimated frequency correction factor from said frequency offset value.
2. The frequency synchronizer system of claim 1 further comprising a digital receiver for providing an estimate of data encoded in a continuous-phase modulation signal in response to receiving said corrected frequency offset value.
3. The frequency synchronizer system of claim 1 further comprising an anti-aliasing filter for transforming said continuous-phase modulation signal into a filtered signal.

4. The frequency synchronizer system of claim 3 further comprising a sampler for transforming said filtered signal into a sequence of discrete time based samples.

5. A frequency synchronizer system, comprising:
   a sample signal, $x(kT_s)$, where k is the sample index and $T_s$ defines the sampling interval in seconds;
   means for determining a corrected frequency offset value, $y(kT_s)$, from a first product of said sample signal and an estimated frequency correction factor, wherein said estimated frequency correction factor is a discrete time sequence defined by $e^{-j2\pi k\hat{v}T_s}$ and where $\hat{v}$ is an estimate of unknown frequency offset V;
   means for filtering a first sample of said corrected frequency offset value, $y(kT_s)$, to obtain a filtered corrected frequency offset value, $w(kT_s)$;
   means for imparting a delay D to a second sample of said corrected frequency offset value, $y(kT_s)$, to obtain a delayed corrected frequency offset value, $y[(k-D)T_s]$;
   means for transforming into a conjugate product value, $w^*(kT_s)\,w(kT_s)$ said filtered corrected frequency offset value, $w(kT_s)$;
   means for determining a delay conjugate value from a third product of said delayed corrected frequency offset value, $y[(k-D)T_s]$, and said conjugate product value, $w^*(kT_s)\,w(kT_s)$;
   means for determining an error signal, $e(nT)$, where n is a positive integer index allowing for the generation of updated error signals at intervals of T seconds, from said delay conjugate value, $y[(k-D)T_s]$;
   means for determining a frequency offset value, $\hat{v}(nT)$, from said error signal, $e(nT)$; and
   means for determining an updated value of said estimated frequency correction factor from said frequency offset value, $\hat{v}(nT)$.

6. The frequency synchronizer system of claim 5 further comprising a digital receiver for providing an estimate of data encoded in a continuous-phase modulation signal in response to receiving said corrected frequency offset value.

7. The frequency synchronizer system of claim 5 further comprising an anti-aliasing filter for transforming said continuous-phase modulation signal into a filtered signal.

8. The frequency synchronizer system of claim 7 further comprising a sampler for transforming said filtered signal into a sequence of discrete time based samples.

9. A method for frequency synchronization, comprising the steps of:
   (a) initializing an estimated frequency correction factor;
   (b) determining a corrected frequency offset value from a first product of a sample signal and said estimated frequency correction factor;
   (c) filtering a first sample of said corrected frequency offset value to obtain a filtered corrected frequency offset value;
   (d) imparting a delay to a second sample of said corrected frequency offset value to obtain a delayed corrected frequency offset value;
   (e) transforming said filtered corrected frequency offset value into a conjugate product value;
   (f) determining a delay conjugate value from a third product of said delayed corrected frequency offset value and said conjugate product value;
   (g) determining an error signal from said delay conjugate value;
   (h) determining a frequency offset value from said error signal; and
   (i) determining an updated value of said estimated frequency correction factor from said frequency offset value.

10. The method of claim 9 wherein said steps (b) through (i) are repeated an integral number of times.

11. The method of claim 9 further including the step of providing an estimate of data encoded in a continuous-phase modulation signal in response to receiving said corrected frequency offset value.

12. The method of claim 11 further including the step of transforming said continuous-phase modulation signal into a filtered signal.

13. The method of claim 12 further including the step of transforming said filtered signal into a sequence of discrete time based samples.

* * * * *